US007906087B2

(12) United States Patent
Aroonwilas et al.

(10) Patent No.: US 7,906,087 B2
(45) Date of Patent: Mar. 15, 2011

(54) HEAT RECOVERY GAS ABSORPTION PROCESS

(75) Inventors: Adisorn Aroonwilas, Regina (CA); Amornvadee Veawab, Regina (CA)

(73) Assignee: University of Regina, Regina, Saskatchewan (CA)

( * ) Notice: Subject to any disclaimer, the term of this patent is extended or adjusted under 35 U.S.C. 154(b) by 0 days.

(21) Appl. No.: 12/294,136

(22) PCT Filed: Mar. 23, 2007

(86) PCT No.: PCT/CA2007/000461
§ 371 (c)(1),
(2), (4) Date: Apr. 27, 2009

(87) PCT Pub. No.: WO2007/107004
PCT Pub. Date: Sep. 27, 2007

(65) Prior Publication Data
US 2010/0003177 A1    Jan. 7, 2010

(51) Int. Cl.
*B01D 53/34* (2006.01)
*B01D 53/38* (2006.01)
*B01D 53/50* (2006.01)
*B01D 53/52* (2006.01)
*B01D 53/56* (2006.01)
*B01D 53/62* (2006.01)
*B01D 53/74* (2006.01)
*B01D 53/78* (2006.01)

(52) U.S. Cl. ........ 423/210; 423/220; 423/226; 423/228; 423/242.1; 423/242.2; 423/242.7; 423/235; 423/DIG. 6; 423/DIG. 8; 422/168; 422/169; 422/170; 422/171; 422/172; 422/181

(58) Field of Classification Search .................. 423/210, 423/220, 226, 228, 242.1, 242.2, 242.7, 235, 423/DIG. 6, DIG. 8; 422/168–172, 181
See application file for complete search history.

(56) References Cited

U.S. PATENT DOCUMENTS
6,102,987 A * 8/2000 Gross et al. ..................... 95/172
6,645,446 B1 * 11/2003 Won et al. ..................... 423/210

FOREIGN PATENT DOCUMENTS
CA       2498195 A1 *  4/2004
WO   WO 2004/073838 A1 *  9/2004

* cited by examiner

*Primary Examiner* — Timothy C Vanoy
(74) *Attorney, Agent, or Firm* — Gowling Lafleur Henderson LLP (57) ABSTRACT

Apparatus comprising an absorber device provided with a plurality of sequentially adjacent sections for flowing a gas stream therethrough. A solvent reactable with components of the gas stream is ingressed into and egressed from each section of the absorber device by a conduit infrastructure. The conduit infrastructure has a plurality of heat exchange and cooling equipment, and communicates with solvent recovery and regeneration equipment. A process wherein a liquid solvent selected for reacting with gaseous components, is counter-flowed against the gas stream. The liquid solvent temperature is controllably manipulated between each section of the absorber device to provide: (a) thermodynamic-driven mass transfer at the front end of the absorber device, and (b) kinetic-driven mass transfer at the back end of the absorber device. Heat generated during recovery of gaseous components from the liquid solvent is recovered for use in regenerating the solvent system.

41 Claims, 3 Drawing Sheets

HEAT RECOVERY GAS ABSORPTION PROCESS

CROSS-REFERENCE TO RELATED APPLICATION

This application claims benefit under 35 U.S.C. 120, of U.S. application Ser. No. 11/386,824 filed on Mar. 23, 2006, now abandoned, which is incorporated herein, by reference, in its entirety.

TECHNICAL FIELD

This invention relates to the removal of gaseous components from industrial gas streams. More particularly, this invention relates to apparatus and processes for separation and recovery of gaseous components from process gas streams and/or exhaust gas streams.

BACKGROUND ART

Gas absorption, separation and recovery processes have long been provided for both industrial and environmental purposes. Industrial applications typically involve processes for separation and removal of at least one gaseous component from a process gas stream in order to enhance the quality of gas products produced and/or to prevent undesirable downstream operational problems that might subsequently occur in downstream processes. Examples are the removals of carbon dioxide ($CO_2$) and/or hydrogen sulfide ($H_2S$) from natural gas and synthesis gas, and the removals and separations of volatile organic compounds (VOCs) and gases such as nitrogen ($N_2$), oxygen ($O_2$) and hydrogen ($H_2$) from industrial process gas streams. Environmental applications typically involve the removal of at least one gaseous component such as sulfur dioxide ($SO_2$), $CO_2$, oxides of nitrogen ($NO_x$), and mercury (Hg) from combustion flue gases or exhaust gas streams in order to reduce emissions of air pollutants to the atmosphere.

Large-scale combustion processes are commonly used for municipal and industrial energy production, in the manufacturing of refined products from raw ores and other crude materials, and for the disposal of municipal and industrial waste materials. Such combustion processes typically produce on a continuous basis, large volumes of gaseous exhaust waste streams that contain one or more highly undesirable gaseous compounds such as $CO_2$, $H_2S$ and $NO_x$ among others, which cause significant environmental pollution and health risks. In particular, persistently increasing atmospheric concentrations of $CO_2$ arising from large-scale continuous municipal and industrial combustion are the primary cause of global warming which is responsible for increasing trends in the incidences of environmental perturbations and pollution-associated health problems.

Despite their widespread use, industrial gas absorption processes currently in use present economic shortcomings due to significant energy requirements for regeneration of solvents used for absorbing selected gases from the process or exhaust gas streams. This causes an impediment for industry to reduce the energy and process costs, and to meet their environmental performance targets.

DISCLOSURE OF THE INVENTION

The exemplary embodiments of the present invention, at least in preferred forms, are directed to apparatus and processes for high-capacity energy-efficient: (a) removal of at least one gaseous component from a process gas stream or exhaust gas stream into a liquid solvent system configured to absorb and assimilate the gaseous component, followed by (b) separation and recovery of the gaseous component from the liquid solvent system.

According to one preferred embodiment of the invention, there is provided an apparatus comprising an absorber device provided with a plurality of sequentially adjacent sections, said absorber device communicating with a conduit infrastructure conveying a liquid solvent system therein, said conduit infrastructure configured to ingress into and egress from each section of the absorber device. In a preferred form, the absorber comprises a vertically oriented column provided with a plurality of vertical sequentially positioned adjacent sections. An inlet for a process gas stream is provided near the bottom of the absorber, while an outlet for the gas stream wherefrom a selected gaseous component has been removed, is provided at the top of the absorber. Alternatively, a waste exhaust gas stream can be flowed through the absorber device for removing a selected gaseous component therefrom. The gas stream travels sequentially through the adjacent sections of the absorber against a counter-current flow or a cross-flow of the liquid solvent system. The liquid solvent system is provided with at least one chemical component to absorb and/or assimilate and/or sequester the gaseous component from the gas stream.

According to one aspect, there is provided a conduit infrastructure configured to ingress the absorber by communicating with the top portion of the first section, i.e., the section adjacent to the absorber gas stream outlet, and to egress from the bottom of the absorber device. It is preferred that the conduit infrastructure is a piping infrastructure. In a preferred form, the piping infrastructure sequentially ingresses into the top portion and egresses from the bottom portion of each adjacent section of the absorber. In another preferred form, there is provided a lean heat transfer unit interposed a portion of the piping infrastructure that ingresses into the top portion of the first section of the absorber device. It is preferred that the piping infrastructure is provided with a lean cooler unit interposed said lean heat transfer unit and the first section of the absorber. It is further preferred that the piping infrastructure ingresses a temperature-manipulated lean absorption liquid into the top portion of the first section of the absorber.

According to another aspect, there is provided a heat transfer unit interposed a portion of said piping infrastructure which egresses from the bottom portion of the first section of the absorber and ingresses into the top portion of the adjacent section of the absorber. In a preferred form, said portion of piping infrastructure is provided, interposed said heat transfer unit and the top portion of the adjacent section of the absorber, an interconnection with a portion of piping infrastructure conveying therein a heated liquid solvent system.

According to yet another aspect, there is provided a heat transfer unit interposed each portion of the piping infrastructure that egresses from the bottom portion of a section of the absorber and ingresses into the top portion of the adjacent section of the absorber. In a preferred form, each portion of the piping infrastructure is provided, interposed said heat transfer unit and the top portion of the adjacent section of the absorber, a cooling unit. It is preferred that the cooling unit is a pinched cooling unit.

According to yet a further aspect of the present invention, there is provided a removal piping infrastructure communicating with the bottom of the absorber for removing therefrom an enriched absorption liquid, i.e., absorption liquid containing therein the gaseous component that has been removed from the process gas stream or the exhaust gas stream. In a preferred form, the removal piping infrastructure is interconnected with and cooperates with the heat exchange units provided for each portion of the liquid infrastructure communicating with the sections adjacent to the first section of the absorber whereby the heat energy removed by a heat exchange unit from absorption liquid withdrawn from the bottom portion of each section, is transferred to the enriched absorption liquid being conveyed through said heat exchange unit by the removal piping infrastructure. It is further preferred that the removal piping infrastructure is interconnected with and cooperates with the lean-rich heat exchange unit for transferring heat from the hot lean absorption liquid to the enriched absorption liquid being conveyed through said lean-rich heat exchange unit by the removal piping infrastructure.

According to yet another aspect of the present invention, the removal piping infrastructure is interconnected with and cooperates with a first plurality of equipment configured to: (a) separate from the enriched absorption liquid solvent, a stream containing the selected gaseous component removed from the gas stream, and (b) regenerate the enriched absorption liquid into a lean absorption liquid. In a preferred form, a second plurality of equipment is provided for recovering the separated stream of selected gaseous component, and further processing and/or purification said selected gaseous component prior to its use for other industrial processes. Alternatively, the recovered and purified gaseous component may be conveyed to and stored in containers selected for that purpose.

According to another preferred embodiment of the invention, there is provided a process for removing and recovering a selected gaseous component from a process gas stream or exhaust gas stream. The gas stream is flowed sequentially through a multi-sectioned absorber unit wherein the selected gaseous component is removed by repeatedly commingling and contacting the upward flowing gas stream with a counter-flowing or cross-flowing temperature-manipulable and temperature-controllable liquid solvent system comprising at least one chemical constituent selected for its propensity to absorb and/or assimilate and/or sequester and/or react with said gaseous component. It is preferable that the liquid solvent system is a lean absorption liquid that is controllably cooled before it is ingressed into the top, i.e., the first section of the absorber, wherein it counter-currently or cross-currently commingles with and contacts the gas stream thereby removing a portion of the selected gaseous component from the gas stream and partially loading the lean absorption liquid. The partially loaded absorption liquid is egressed from the bottom portion of the first section by the piping infrastructure and is conveyed through at least one heat exchange unit wherein the partially loaded absorption liquid is heated to an elevated temperature before it is ingressed into the top portion of the underlying, i.e., the second section. In a preferred form, the temperature of the heated partially loaded absorption liquid is adjusted by controllably intermixing with a hot lean absorption liquid. The partially loaded absorption liquid counter-flows or cross-flows through the second section against the gas stream flowing therethrough and removes an additional portion of the selected gaseous component from the gas stream thereby becoming an increasingly loaded absorption liquid. The increasingly loaded absorption liquid is egressed from the bottom portion of the second section by the piping infrastructure and is conveyed through at least one heat exchange unit and one cooling unit configured for cooling and controlling the temperature of the increasingly loaded absorption liquid before it is ingressed into the top portion of the underlying, i.e., the third section. The increasingly loaded absorption liquid counter-flows or cross-flows through the third section against the gas stream flowing therethrough and removes an additional portion of the selected gaseous component from the gas stream thereby becoming a highly loaded absorption liquid. The highly loaded absorption liquid is withdrawn from the bottom portion of the third section by the piping infrastructure, and is conveyed through at least one heat exchange unit and one cooling unit configured for cooling and controlling the temperature of the absorption liquid before it is returned to the top of the bottom, i.e., the last section. The highly loaded absorption liquid counter-flows or cross-flows through the last section against the gas stream flowing therethrough and removes a final portion of the selected gaseous component from the gas stream thereby becoming an enriched absorption liquid. The enriched absorption liquid is removed from the bottom portion of the absorber by a removal piping infrastructure for conveyance to a plurality of equipment selected and configured for recovering the absorbed gaseous component contained within the absorption liquid and for regenerating the absorption liquid into a lean absorption liquid before recycling it to the absorber device.

According to one aspect, there is provided a liquid solvent system for communicating with the absorber device by conveyance therethrough in communication with the piping infrastructure. The liquid solvent system comprises an absorption solution configured for absorbing and/or assimilating and/or sequestering and/or reacting with a selected gaseous component from a process gas stream, or alternatively, from an exhaust gas stream flowing through the absorber. The absorption solution is considered a lean absorption liquid when it ingresses the top portion of the first section adjacent the absorber gas stream outlet, and becomes increasing enriched with the selected gaseous component as the absorption solution counter-flows or cross-flows through the adjacent sections against the flow of the gas stream through the absorber thereby becoming a rich absorption liquid when it egresses from the bottom of the absorber.

In a preferred form, the absorption liquid comprises an absorption solution provided with at least one chemical component selected for absorbing and/or assimilating and/or sequestering and/or reacting with a selected gaseous component present in the process gas stream or exhaust gas stream or a refining gas stream. The selected gaseous component includes a gas selected from the group comprising $CO_2$, $H_2S$, $SO_2$, and $NO_x$.

In another preferred form, the absorption liquid comprises: (a) an aqueous solution provided with at least one chemical component selected for absorbing and/or assimilating and/or sequestering and/or reacting with a selected gaseous component present in the process gas stream or exhaust gas stream, and (b) at least one chemical component selected from the group comprising kinetic enhancers, corrosion inhibitors, anti-foam chemicals, oxygen scavengers, salt neutralizers, antifouling and anti-degradation chemicals.

It is preferred that the lean absorption liquid is controllably cooled and adjusted to a selected temperature prior to its ingress into the first section of the absorber device. In a preferred form, there is provided a plurality of equipment for cooling and controlling the temperature of said lean absorption liquid. In a further preferred form, there is provided at least one heat transfer unit such as lean-rich heat exchanger for cooling the lean absorption liquid and at least one heat transfer unit for adjusting and refining the temperature of the cooled liquid solvent.

According to another aspect, the liquid solvent system is configured to remove $CO_2$ from a combustion exhaust gas stream using the apparatus of the present invention. The liquid solvent system provides an absorption solution comprising an absorption liquid containing therein at least one chemical compound selected from the group comprising monoethanolamine (MEA), diglycolamine (DGA), diethanolamine (DEA), methyldiethanolamine (MDEA), 2-amino-2-methyl-1-propanol (AMP), piperazine (PZ), ammonia, amines, alkanolamines, their derivatives and other chemical solvents and/or mixtures thereof. The liquid solvent system may further comprise at least one chemical component selected from the group comprising kinetic enhancers, corrosion inhibitors, anti-foam chemicals, oxygen scavengers, salt neutralizers, anti-fouling and anti-degradation chemicals.

According to yet another preferred embodiment of the invention, there are provided processes for separating, removing and recovering the selected gaseous component from the enriched absorption liquid. Heated enriched absorption liquid egressing from the bottom of the absorber device is conveyed into a regenerator wherein the enriched absorption liquid is separated into: (a) a stream of hot lean absorption liquid which is egressed from the bottom of the regenerator and subsequently conveyed to a reboiler unit, and (b) a stream of hot vapor mixtures egressing from the top of the regenerator. A large portion of waste heat energy which alternatively could be removed from the process through a reflux condenser, is recovered by a process of the present invention with a heat-recovery condenser thereby producing a stream of heated condensate which is delivered to the reboiler unit wherein the recovered heat energy is utilized for regeneration of the liquid solvent system, thereby significantly reducing energy inputs required for the process of the present invention.

According to a further preferred embodiment of the invention, there is provided a process for reducing vapor loss of water and absorption liquid through the treated gas exiting from the top of the absorber. The process involves two-step vapor reduction. The first step of vapor reduction takes place in the first section of the absorber into which the controllably cooled lean absorption liquid is ingressed, thereby reducing the temperature of treated gas stream and knocking off the water vapor and absorption liquid vapor. The second step of vapor reduction takes place in the treated gas condenser operated at a low temperature.

BRIEF DESCRIPTION OF THE DRAWINGS

The present invention will be described in conjunction with reference to the following drawing in which.

BEST MODES FOR CARRYING OUT THE INVENTION

The present invention provides apparatus and processes for energy-efficient removal and recovery of at least one gaseous component from process gas streams or exhaust gas streams emanating from chemical processes and/or combustion processes. The invention provides an apparatus comprising an absorber device configured with a plurality of sequentially adjacent sections, said absorber device communicating with a multi-sectioned piping infrastructure conveying a liquid solvent system therein, said piping infrastructure configured to ingress into and egress from each section of the absorber device. The gas stream travels sequentially through the adjacent sections of the absorber against a counter-current flow of the liquid solvent system. The liquid solvent system is provided with at least one chemical component to absorb and/or assimilate and/or sequester and/or react with the gaseous component from the gas stream.

The multi-sectioned piping infrastructure is provided with: (a) at least two heat-exchange units configured for cooling absorption liquid flowing therethrough, (b) at least one heat-exchange unit configured for heating liquid solvent system flowing therethrough, each of said heat exchange units for cooling in item (a) cooperating with at least one dedicated cooling unit for precise temperature control of the liquid solvent system flowing through the piping infrastructure into the different sections of the absorber. The multi-sectioned piping infrastructure is configured to: (1) ingress into the top portion and egress from the bottom portion of each section provided within the absorber, and (2) to cooperate with a heat exchange unit and/or a cooling unit interposed between each section of the absorber, said units configured to modulate, manipulate and control the temperature of the liquid solvent system flowing therethrough. The absorber is configured to receive near its bottom end a process gas stream or an exhaust gas stream containing at least one gaseous component to be removed, and to release from the opposite end of the absorber a stream of treated gas containing a reduced concentration of said gaseous component.

The piping infrastructure cooperates with at least one reboiler unit for regenerating the liquid solvent system, at least two heat exchange units configured for cooling the liquid solvent system flowing therethrough and at least one cooling unit for precise temperature control of the cooled liquid solvent system to be delivered to the first section of the absorber. The delivery side of the piping infrastructure communicates with a first section of the absorber adjacent to the end wherefrom the treated gas stream is released.

The absorber device is provided with a second section adjacent the first section. The second section is configured to: (a) communicate with a first portion of the piping infrastructure cooperating with said heat exchange unit configured for heating the liquid solvent system egressing from the bottom portion of the first section prior to the return of the absorption liquid to the top portion of the second section of the absorber, and (b) communicate with a second portion of the piping infrastructure that egresses the absorption liquid from the bottom portion of the second section and ingresses into the top portion of an underlying third section. At least one heat exchange unit and a cooling unit are interposed the second portion of the piping infrastructure for controllably cooling and manipulating the temperature of absorption liquid solvent flowing therethrough from the second to the third section of the absorber.

The absorber device is provided with a third section adjacent the second section. The third section is configured to: (a) communicate with a first portion of the piping infrastructure cooperating with at least one heat exchange unit and a cooling unit configured for controllably cooling and manipulating the temperature of absorption liquid solvent system egressing from bottom portion of the second section prior to the return of the absorption liquid to the top portion of the third section of the absorber, and (b) communicate with a second portion of the piping infrastructure that egresses the absorption liquid from the bottom portion of the third section and ingresses into the top portion of an underlying forth section. At least one heat exchange unit and a cooling unit are interposed the second portion of the piping infrastructure for controllably cooling and manipulating the temperature of absorption liquid solvent flowing therethrough from the third to the fourth section of the absorber.

If so desired, the absorber may be provided with a plurality of the sections configured similarly to the third section to communicate with a corresponding portion of the piping infrastructure cooperating with at least one dedicated heat exchange unit configured for cooling absorption liquid solvent flowing therethrough and a dedicated cooling unit for precise temperature control of absorption liquid solvent flowing from the bottom portion of one section before it ingresses the top portion of the adjacent underlying section of the absorber.

The exit side of the piping infrastructure i.e., the portion of piping infrastructure configured to remove the liquid solvent system from the last section of the absorber, is interconnected with the bottom end of the absorber adjacent the inlet for the gas stream. On the exit side from the absorber, the piping infrastructure communicates with at least one heat exchange unit configured for heating the liquid solvent system flowing through the piping infrastructure on the exit side of the absorber, while at the same time cooling the liquid solvent system flowing through the piping infrastructure interposed the second section and bottom section of the absorber, then communicates with at least one heat exchange unit configured for cooling the liquid solvent system flowing through the piping infrastructure into the absorber, and then is interconnected with a series of equipment selected and configured for: (a) separating and recovering the absorbed gaseous component contained within the liquid solvent system thereby stripping and regenerating the liquid solvent system, and (b) for bringing the stripped liquid solvent system to its boiling point thereby completing the regeneration process. Those skilled in these arts will understand that suitable equipment may include condensers, phase separators, regenerators and reboilers commonly used in heating and cooling infrastructure installations. Suitable regenerator units may be configured as packed-type or trayed-type, or spray-type or membrane-type units. The configuration of the apparatus of the present invention may include one regenerator unit or alternatively, a plurality of cooperating units. The reboiler unit may be a standard reboiler unit known in the art and may be operable by steam, combustion, electricity or other suitable heating source.

The invention also provides processes for removing at least one selected gaseous component from gas streams emanating from chemical and/or combustion processes by flowing a gas stream containing at least one gaseous component to be removed through said multi-sectioned absorber, and commingling and contacting the gas stream with a temperature-manipulable and temperature-controllable lean absorption liquid solvent system configured to absorb and/or sequester and/or react with said gaseous component, through a sequential series of temperature adjustments to the absorption liquid solvent system while the gas stream is flowing upward through said absorber. Those skilled in this art will understand that a lean absorption liquid is an absorption liquid comprising at least one chemical compound selected to react with and/or sequester and/or absorb a selected gaseous component but actually contains very little of the certain gaseous component, and that an enriched absorption liquid is an absorption liquid solvent that has been saturated with the selected gaseous component removed from the gas stream. The absorption liquid may optionally further comprise additives such as kinetic enhancers, corrosion inhibitors, anti-foam chemicals, oxygen scavengers, anti-degradation chemicals, salt neutralizers, anti-fouling and other selected additives. Those skilled in this art will also understand that the term "scrubbing" can be used to describe the reaction and/or sequestering and/or absorption of a selected gaseous component by an absorption liquid configured to react with and/or sequester and/or absorb said gaseous component, and that the term "treated" can be used to describe a gas stream from which said gaseous component has been removed by reaction and/or sequestering and/or absorption with an absorption liquid configured for that purpose. The term "scrubbed" can be used to describe said gaseous component that has been removed by the absorption liquid from the gas stream.

The process comprises flowing a gas stream through an absorber provided with a plurality of sequentially adjacent sections wherein the incoming gas stream is commingled with a temperature-manipulable and temperature-controllable absorption liquid solvent system intercalating within and throughout the sections whereby a gaseous component present in the gas stream is increasingly scrubbed out by the absorption liquid solvent system as gas stream flows through the sequentially adjacent sections of the absorber. At the same time the gas stream is flowing through the multi-sectioned absorber, the temperature-manipulable and temperature-controllable absorption liquid counter-flows or cross-flows through each section of the absorber against the flow of gas stream. Specifically, the temperature of the absorption liquid is adjusted to a relatively cool temperature prior to delivery and ingress of the cooled absorption liquid into the top portion of the first section of the absorber. The cooled absorption liquid then flows downward against the upward flow of gas stream in the first section thereby commingling and contacting with said gas stream which results in the scrubbing and removal of the gaseous component into the absorption liquid, which is then considered to be a partially loaded absorption liquid. In addition to the scrubbing aspect, the commingling and contacting of the cooled absorption liquid with the gas stream generates heat energy within the absorption liquid. The heated partially loaded absorption liquid solvent egresses the first section at its bottom portion and passes through a heat exchange unit wherein the temperature of said partially loaded absorption liquid is further raised after which, the heated and temperature-manipulated partially loaded absorption liquid is ingressed to the top portion of the second section of the absorber. The temperature-adjusted partially-loaded absorption liquid then flows downward against the upward flow of gas stream in the second section thereby commingling and contacting with said gas stream which results in additional heat generation and scrubbing and removal of the gaseous component into the absorption liquid solvent, which is then considered to be a heated increasingly loaded absorption liquid solvent. The heated increasingly loaded absorption liquid solvent then egresses the second section at its bottom portion and flows into a heat exchange unit wherein the temperature of said increasingly loaded absorption liquid is lowered after which, the temperature-manipulated increasingly loaded absorption liquid flows through a cooling unit wherein the temperature of said absorption liquid is further cooled to a selected value, after which the cooled and temperature-adjusted increasingly-loaded absorption liquid solvent ingresses into the top portion of the third section of the absorber. The temperature-adjusted increasingly-loaded absorption liquid then flows downward against the upward flow of gas stream in third section of the absorber thereby commingling and contacting with said gas stream which results in additional heat generation and further scrubbing and removal of the gaseous component into the absorption liquid, which is then considered to be a heated highly loaded absorption liquid. The heated highly loaded absorption liquid solvent then egresses the third section at its bottom portion and flows into a heat exchange unit wherein the temperature of said highly loaded absorption liquid solvent is cooled after which, the temperature-manipulated highly loaded absorption liquid flows through a cooling unit wherein the temperature of said absorption liquid is adjusted further cooled to a selected value, after which the cooled temperature-adjusted highly loaded absorption liquid solvent ingresses into the top portion of the fourth section of the absorber. The cooled temperature-adjusted highly-loaded absorption liquid then flows downward against the upward flow of gas stream in fourth section of the absorber thereby commingling and contacting with said gas stream as it enters the absorber and begins to flow upward which results in additional heat generation and scrubbing and removal of the gaseous component into the highly loaded absorption liquid, which is then considered to be a heated enriched absorption liquid. Those skilled in this art will understand that an enriched absorption liquid is a lean absorption liquid that has been saturated with the gaseous component removed from the gas stream. It is to be noted that the gas stream containing the selected gaseous component is increasingly stripped of the gaseous component as the gas stream flows upward through the fourth, then third, then second, then first sections in the absorber while the lean absorption liquid becomes increasingly loaded with the scrubbed gaseous component as the absorption liquid flows downward through the first, then the second, then the third, then the fourth sections of the absorber.

It is to be noted that additional sections may be added sequentially adjacent underneath the third section to provide more scrubbing of a gas stream flowing through the absorber to ensure energy-efficient removal of the selected gaseous component from the gas stream.

The process of the present invention provides an inverse temperature profile in the absorber device which is opposite to the profiles of the prior art conventional processes. In the typical operation of conventional processes, the temperature of absorber top is much lower than that of absorber bottom due to the release of heat energy from gas absorption. In contrast, the process of the present invention provides higher temperatures at the second section near the absorber top than at the gas inlet end of the absorber by the use of heat transfer equipment to: (a) heat partially loaded absorption liquid solvents at the second section of the absorber, and (b) to cool the absorption liquid solvents as they become increasingly enriched as they proceed toward the gas inlet end of the absorber device. Consequently, the heat captured during the cooling of the increasingly enriched liquid solvents is used for heating the rich absorption liquid solvent egressing the bottom of the absorber device. The absorption capacity of the increasingly enriched absorption liquid solvent is increased by the use of pinched coolers cooperating with the heat transfer equipment to control the temperature of the enriched liquid solvent re-entering the absorber.

In addition to the multi-sectioned absorber and piping infrastructure, the invention also provides processes for recovering the selected gaseous component from the heated enriched absorption liquid. The heated enriched liquid is fed into a regenerator, wherein it is processed to provide a stream of hot lean absorption liquid withdrawn from a reboiler unit at the bottom of the regenerator and a stream of hot vapor mixtures exiting the top of the regenerator. The waste heat energy in the hot vapor stream is recovered by a heat-recovery condenser to produce a stream of heated condensate being delivered to the reboiler unit wherein the recovered heat energy is utilized for liquid regeneration, thus reducing the energy consumption of the absorption process.

The present invention provides a process for reducing the loss of water and absorption liquid from the top of absorber in the gas stream egressing through the gas outlet. The process involves two-step water balance control wherein the first-step uses the cool-lean absorption liquid from lean cooler to reduce the temperature of treated gas and to knock off the vapor of water and absorption liquid. The second-step water control uses the treated gas condenser operated at low temperature for final vapor loss reduction before the gas stream egresses out of the apparatus.

Figure 1:
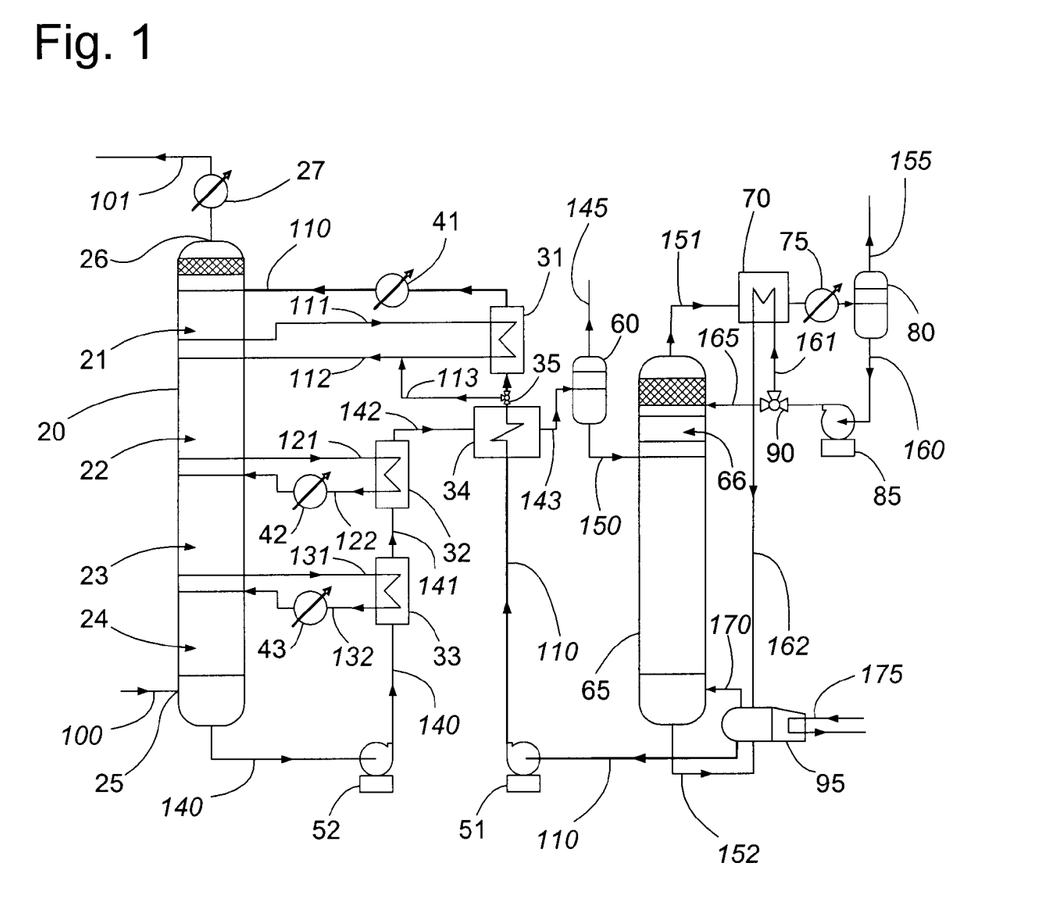
FIG. 1 is a schematic diagram illustrating one embodiment of the present invention.

An exemplary embodiment of the heat recovery gas absorption apparatus of the present invention is shown in the accompanying FIG. 1 and comprises a vertically orientated absorber 20 configured with a gas inlet 25 near the bottom of the absorber, a gas outlet 26 at the top of the absorber, and a plurality of sequentially stacked first section 21, second section 22, third section 23 and fourth section 24, said sections sequentially interposed the outlet 26 and inlet 25. A process gas stream or exhaust gas stream 100 containing at least one gaseous component, e.g., $CO_2$ enters the absorber 20 at inlet 25 and flows upward through sections 24, 23, 22, and 21, and then exits the absorber through the outlet 26. The treated gas then passes through the treated gas condenser 27 which serves to remove any entrainment, i.e. water vapor and liquid solvent vapor.

For the purposes of this example, an absorption liquid solvent system may be configured to react with and/or sequester and/or assimilate and/or absorb $CO_2$ from the gas stream, by the preparation of an aqueous solution containing single or blended alkanolamines such as monoethanolamine, diglycolamine, diethanolamine, methyldiethanolamine, 2-amino-2-methyl-1-propanol, piperazine and their mixtures. The absorption liquid solvent system is heated to boiling in a reboiler 95, which may occur at a temperature from the range of 105° C. to 125° C. depending on the alkanolamine composition of the absorption liquid solvent system. The absorption liquid solvent system at said boiling point is considered to be a "lean" absorption liquid because its $CO_2$ content will be low. The lean absorption liquid is withdrawn from the reboiler 95 into pipeline 110 by lean-liquid pump 51 and then is transferred through firstly, the hot side of a lean-rich heat exchange unit 34 where the temperature of the lean absorption liquid is reduced through transfer of its heat to the enriched absorption liquid passing through the cold side of said heat exchange unit 34 (explained in more detail below), then secondly passes through the hot side of a first heat-recovery heat exchange unit 31 where the temperature of the lean absorption liquid is further reduced by transfer of its heat to the partially loaded absorption liquid passing through the cold side of said heat exchange unit 31, and thirdly through a cooling unit 41 wherein the temperature of the lean absorption liquid is further reduced to a final temperature in the range of 30° C. to 40° C. after which it is into the top portion of the first section 21 of the absorber 20. Such temperature is set to remove the entrainment of water vapor and liquid solvent vapor from the treated gas stream exiting the absorber through the outlet 26.

The lean absorption liquid then counter-flows or cross-flows downward against and commingles and contacts with the upward flowing gas stream thereby absorbing $CO_2$ and retaining heat generated by the exothermic reaction of $CO_2$ with the one or more alkanolamines provided in the absorption liquid. The heated and partially loaded absorption liquid egresses from the bottom of the first section 21 through pipeline 111 which flows through the cold side of a first heat-recovery heat exchange unit 31 wherein heat is transferred from the lean absorption liquid passing through the hot side of said heat exchange unit 31 to the partially loaded absorption liquid thereby further heating the partially loaded absorption liquid to a selected temperature from the range of 40° C. to 70° C. The hot partially loaded absorption liquid exits the heat exchange unit 31 via pipeline 112. The temperature of the partially loaded absorption liquid may be further adjusted in pipeline 112 by controllably diverting through a three-way valve or splitter 35 a portion of the lean absorption liquid exiting the lean-rich heat exchange unit 34 in pipeline 113 so that the diverted lean absorption liquid intermixes with the hot partially loaded absorption liquid in pipeline 112. An important consequence of intermixing the partially loaded absorption liquid with the lean absorption liquid is that the absorption capacity of the hot partially loaded absorption liquid for $CO_2$ is increased before it ingresses into the top portion of the second section 22 of the absorber 20.

The hot partially loaded absorption liquid then counter-flows or cross-flows downward against and commingles with and contacts the upward flowing gas stream thereby further absorbing $CO_2$ and retaining heat released by the exothermic reaction between $CO_2$ and the absorption liquid. The increasingly heated and increasingly loaded absorption liquid egresses from the bottom of the second section 22 through pipeline 121 which enters the hot side of a second heat-recovery heat exchange unit 32 wherein heat is transferred from the heated increasingly loaded absorption liquid to the enriched absorption liquid passing through the cold side of said heat-recovery heat exchange unit 32, thereby cooling said increasingly loaded absorption liquid which then exits the hot side of the heat exchange unit 32 in pipeline 122 and then passes through a first pinched cooling unit 42 to further cool the increasingly loaded absorption liquid to a selected temperature from the range of 30° C. to 40° C. The cooled increasingly loaded liquid solvent then ingresses the top portion of the third section 23 of the absorber 20.

The cooled increasingly loaded absorption liquid then counter-flows or cross-flows downward against and commingles and contacts with the upward flowing gas stream thereby yet further absorbing $CO_2$ and retaining heat released by the exothermic reaction between $CO_2$ and the absorption liquid. The heated highly loaded liquid solvent egresses from the bottom of the third section 23 through pipeline 131 which enters the hot side of a third heat-recovery heat exchange unit 33 wherein heat is transferred from the heated highly loaded absorption liquid thereby cooling said highly loaded absorption liquid which then exits the heat exchange unit 33 in pipeline 132 and then passes through a second pinched cooling unit 43 to further cool the highly loaded absorption liquid to a selected temperature from the range of 20° C. to 40° C. The cooled highly loaded liquid solvent then ingresses the top portion of the fourth section 24 of the absorber 20.

The cooled highly loaded absorption liquid then counter-flows or cross-flows downward against and commingles and contacts with the incoming and upward flowing gas stream thereby even further absorbing $CO_2$ and retaining heat released by the exothermic reaction between $CO_2$ and the absorption liquid, thereby becoming a heated rich absorption liquid. The heated rich absorption liquid is withdrawn from the bottom of the absorber 20 via a pipeline 140 by a rich liquid pump 52 which transfers the $CO_2$-rich liquid through the cold side of the third heat exchange unit 33 wherein the heated $CO_2$-rich liquid is further heated by the heated highly loaded absorption liquid, and exits the third heat exchange unit 33 in pipeline 141 which enters the cold side of the second heat exchange unit 32 wherein the $CO_2$ rich liquid is yet further heated by the heated increasingly loaded absorption liquid, and exits the second heat exchange unit 32 into pipeline 142 which enters the lean-rich exchange unit 34 where more heat is transferred to the rich absorption liquid from the hot lean absorption liquid in pipeline 110. As the $CO_2$-rich absorption liquid is increasingly heated as it passes through firstly the third heat exchange unit 33 and secondly, the second heat exchange unit 32 and thirdly, the lean-rich heat exchange unit 34, some of the $CO_2$ contained within the rich absorption liquid is "stripped", i.e., is released from the absorption liquid back into the gas phase, thus forming two-phase fluid.

The two-phase $CO_2$-rich fluid stream then exits the lean-rich heat exchange unit 34 via pipeline 143 and is delivered to a phase separator 60 wherein the gaseous $CO_2$ stripped out of the rich liquid during its passage sequentially through heat exchange units 33, 32, and 34, is separated and extracted through pipeline 145 for further processing, storage, or utilization while the rich absorption liquid with a reduced $CO_2$ content is transferred through pipeline 150 into a regenerator 65 into a section just underneath the reflux section 66. The rich absorption liquid then travels downward through the regenerator 65 against an upward flow of steam vapor which is generated from the reboiler 95, and serves to further strip the absorbed $CO_2$ from the absorption liquid thereby making it increasingly "leaner". The leaner absorption liquid is transferred from the regenerator 65 through pipeline 152 to the reboiler unit 95. The gaseous stream containing the stripped $CO_2$ and water vapor exits the upper end of the regenerator 65 through pipeline 151. The water vapor is condensed in two stages by firstly, transfer through the hot side of a heat-recovery condenser 70 and then secondly, through a reflux condenser 75. Such a two-stage condensation produces a steam of two-phase fluid which is then flowed through a phase separator 80 wherefrom the high purity $CO_2$ gas stream is then removed through pipeline 155 for further processing, storage, or utilization.

The condensate in the phase separator 80 is withdrawn via pipeline 160 by condensate pump 85 and split into two streams by a three-way valve or splitter 90. The first stream is delivered to the cold side of heat-recovery condenser 70 by pipeline 161 wherein it is significantly heated by heat removed from the hot vapor stream exiting the reflux section 66 of the regenerator 65. The heated condensate is then delivered through pipeline 162 to the reboiler unit 95 wherein the recovered heat energy from the heat-recovery condenser is utilized to heat and regenerate the absorption liquid. The second stream of condensate is delivered through pipeline 165 over the top portion of the reflux section 66 of the regenerator 65.

The heat recovered from the hot vapor stream exiting the regenerator 65 by heat-recovery condenser 70 and subsequently delivered to the reboiler unit 95 by pipeline 162 results in a reduction in the quantity of heating medium required by the reboiler unit 95 through pipeline 175 in order to bring the absorption liquid to its boiling point thereby consuming less energy while maximizing the performance of $CO_2$ stripping and liquid regeneration. The regenerated or lean absorption liquid is then recycled through pipeline 110 back to the absorber 20 for continued scrubbing of $CO_2$ from the gas stream entering the absorber 20 via pipeline 100. The hot vapor stream generated in the reboiler unit 95 is transferred through pipeline 170 into the bottom of the regenerator 65 and flows upwards against the downward flow of the rich absorption liquid to strip $CO_2$ from the rich absorption liquid.

In summary, with reference to the exemplary embodiment shown in FIG. 1 and described herein, $CO_2$ present in the gas stream delivered to the absorber 20 via pipeline 100 is increasingly scrubbed from the gas stream as it flows sequentially upward through sections 24, 23, 22, and 21. In section 21, the relatively low temperature of absorption liquid controls the temperature of treated gas so as to remove any entrainment of water vapor and liquid solvent vapor that may have exited the absorber with the treated gas. The treated gas stream containing a reduced concentration of $CO_2$ exits the absorber through the outlet 26. The treated gas stream then passes through a treated gas condenser 27 which serves to further remove any entrainment of water vapor and liquid solvent vapor, after which, the vapor-eliminated gas stream is released from the apparatus through pipeline 101. Countercurrent or crosscurrent to the upward flow of the gas stream through the absorber, the lean absorption liquid is introduced at the top of the absorber so that it flows downward against and repeatedly commingles and contacts with the gas stream in each of the sections 21, 22, 23 and 24 of the absorber 20. The apparatus of the present invention is configured so that the absorption liquid ingresses the top portion and egresses the bottom portion of each section so that the temperature of the absorption liquid solvent can be precisely manipulated and adjusted between each section of the absorber 20, as illustrated in FIG. 2, in order to provide optimal and maximal scrubbing of $CO_2$ from the gas stream while requiring low energy for solvent regeneration.

Figure 2:
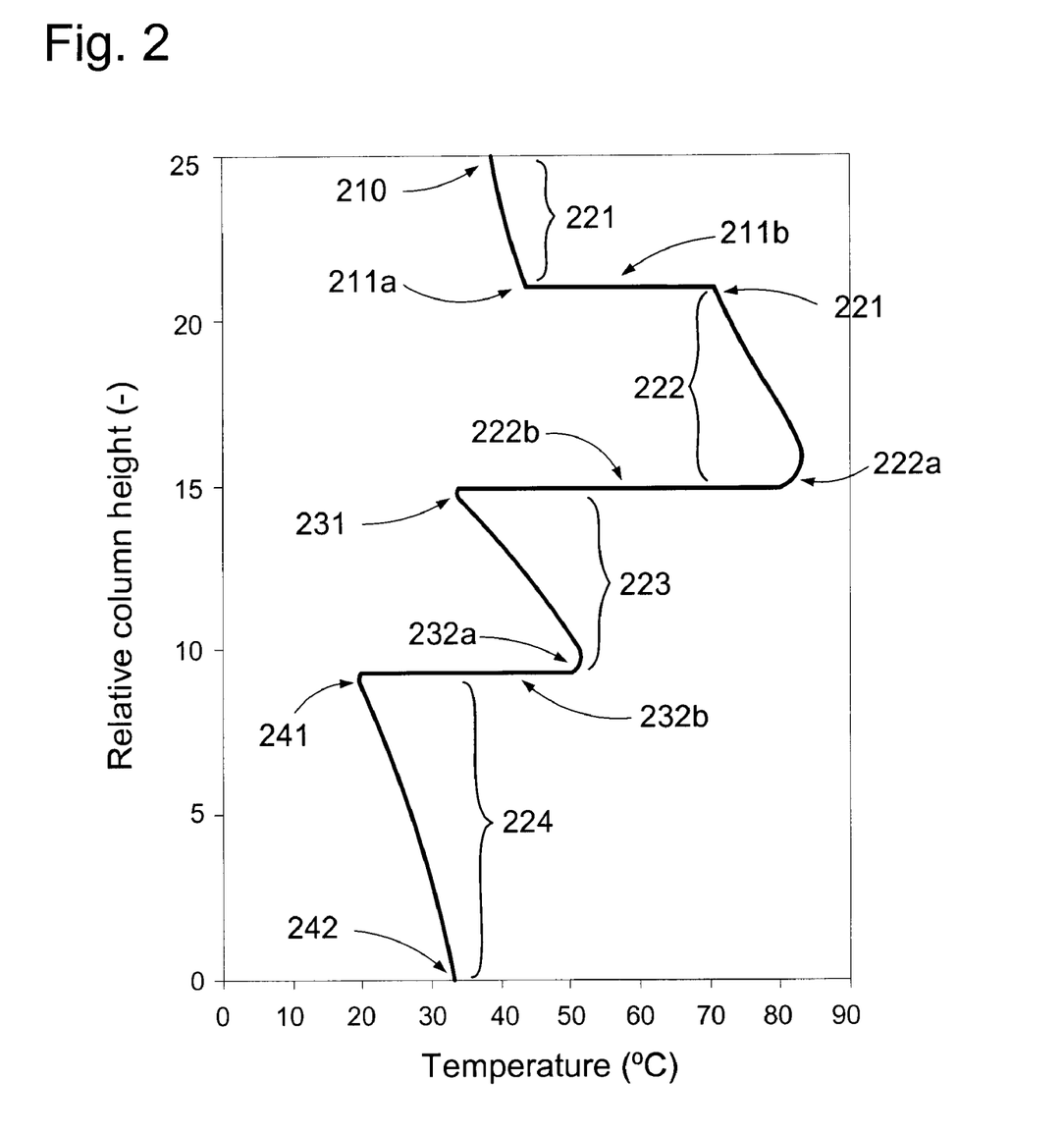
FIG. 2 is a graph illustrating the temperature profiles of an absorption liquid passing through a multi-sectioned absorber of the present invention.

Referring to FIG. 2, the temperature profile 221 of the lean absorption liquid in the first section 21 of the absorber 20 (as illustrated in FIG. 1) compares the increase in the temperature 210 of the feed liquid with the temperature 211a of the egressing partially loaded liquid from about 32° C. to about 40° C., and then shows the manipulation and adjustment of the egressing partially loaded absorption liquid to increase its temperature 211b to about 70° C. The temperature profile 222 of the partially loaded absorption liquid in the second section 22 of the absorber 20 (as illustrated in FIG. 1) compares the increase in the temperature 221 of the ingressing partially loaded absorption liquid with the temperature 222a of the egressing increasingly loaded absorption liquid from about 70° C. to about 80° C., and then shows the manipulation and adjustment of the egressing increasingly loaded liquid solvent to reduce its temperature 222b to about 35° C. The temperature profile 223 of the increasingly loaded liquid solvent in the third section 23 of the absorber 20 (as illustrated in FIG. 1) compares the increase in the temperature 231 of the ingressing cold increasingly loaded absorption liquid with the temperature 232a of the egressing loaded absorption liquid from about 35° C. to about 52° C., and then shows the manipulation and adjustment of the egressing highly loaded absorption liquid to further reduce its temperature 232b to about 25° C. The temperature profile 224 of the highly loaded absorption liquid in the fourth section 24 of the absorber 20 (as illustrated in FIG. 1) compares the increase in the temperature 241 of the ingressing highly loaded absorption liquid with the temperature 242 of the egressing enriched absorption liquid from about 25° C. to about 33° C., before it is removed from the bottom of the absorber 20 by rich pump 52 (as shown in FIG. 1). The enriched absorption liquid is heated in sequence by heat exchanger units 33, 32, and 34, then introduced into the regenerator 65 where the absorbed gaseous component is stripped from the absorption liquid. The lean absorption liquid leaves the regeneration process through the reboiler unit 95, and a stream of hot vapor mixtures exits the top of the regenerator 65. A large portion of waste heat energy in the hot vapor stream is recovered by a heat-recovery condenser 70 to produce a stream of heated condensate being delivered to the reboiler unit 95 wherein the recovered heat energy is utilized for liquid regeneration.

Figure 3:
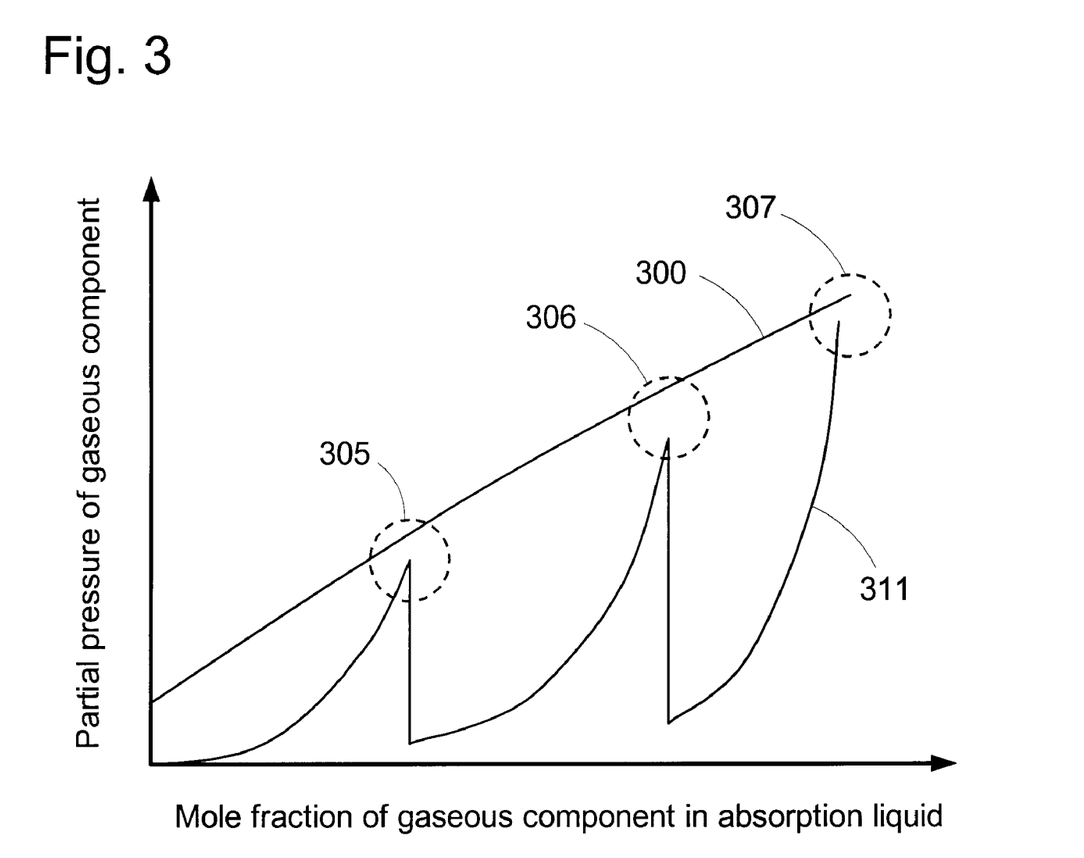
FIG. 3 is a graph illustrating the effects of temperature manipulation on operating and equilibrium curves of the absorber.

FIG. 3 shows a typical McCabe-Thiele diagram for the absorber devices configured and operated as described herein. The relationship between the concentration of specific gaseous component in gas phase (referred to as partial pressure of gaseous component) and the concentration of the said gaseous component in absorption liquid (referred to as liquid mole fraction of gaseous component) is represented by lines 300 and 311. Line 300 is commonly known by those skilled in these arts as the operating line, and illustrates the relationship between the partial pressure of the gaseous component and the liquid mole fraction of the gaseous component that actually prevails inside the absorber device. Line 311 is commonly known by those skilled in these arts as the equilibrium line presenting the partial pressure of gaseous component in equilibrium with the said liquid mole fraction of gaseous component. In the gas absorption operation, the operating line must lie above the equilibrium line in order to facilitate the transfer of gaseous component from gas stream to absorption liquid. It should be noted that the operating line shows that the partial pressure of gaseous component increases as the liquid mole fraction increases. In a typical gas absorption process, the partial pressure of gaseous component in the equilibrium line also increases with the liquid mole fraction. The equilibrium partial pressure of gaseous component, however, increases at a much higher rate compared to the operating partial pressure of gaseous component. This will result in an early crossing between the operating and equilibrium lines, thus limiting the gas absorption capacity. In this invention, the temperature of the absorption liquid passing through the absorber is manipulated and controlled by pinch coolers thereby preventing the early crossing between the operating and equilibrium lines, but instead establishing pinch regions shown as 305, 306, and 307 between the two lines, thereby providing a significant enhancement in gas absorption capacity.

Another exemplary embodiment of the present embodiment provides an absorber device in the form of a vertically oriented absorption column configured with a plurality of vertical sequentially stacked sections interposed a process gas inlet near the bottom of the column and a treated process gas outlet at the top of the column. The plurality of sections may optionally be filled with either random-type or structured-type packing known to those skilled in these arts. Alternatively, the absorber device may comprise other types of gas-liquid contacting devices known to those skilled in these arts as exemplified by trayed-type absorbers, spray-type absorbers, and membrane gas absorbers. Furthermore, it is within the scope of the present invention to sequentially configure a plurality of different types of absorbers wherein each individual absorber provides an individual section of the absorber device disclosed herein.

In summary, the apparatus of the present invention as exemplified in this example, is configured to provide means for:
(1) recovering heat from a regenerated lean absorption liquid during its conveyance from a reboiler unit to an absorber, and the use of the recovered heat to (a) heat and adjust the temperature of the partially loaded absorption liquid after it has egressed from the first section of an absorber, i.e., the section adjacent the absorber outlet for the treated gas stream, in order to improve the absorption efficiency in the second section of the absorber, and (b) further heat the rich absorption liquid emanating from the bottom of the absorber prior to downstream phase separation and regeneration of the absorption liquid,
(2) recovering heat from the increasingly loaded absorption liquid after its egress from the second and third sections of the absorber to: (a) precisely cool and adjust the increasingly loaded absorption liquid to further increase its $CO_2$ absorption capacity and efficiency, and (b) use the recovered heat for repeated heating of the rich absorption liquid as it is conveyed from the absorber to the downstream phase separation and liquid regeneration processes, (3) recovering heat from the hot vapor stream exiting the top of a regenerator to (a) heat the condensate withdrawn from the phase separator located downstream of the reflux condenser, and (b) recycle the recovered heat for liquid regeneration in the reboiler, and (4) reducing the entrainment of water vapor and liquid solvent vapor that may have exited the absorber with the treated gas stream by using the treated gas condenser, thereby providing extremely heat-retentive and recycling energy-efficient processes for removing $CO_2$ from gas streams.

The present invention provides a process to operate the apparatus of the present invention to minimize heat waste while achieving high gas absorption performance during removal and recovery of selected gaseous components from process or exhaust gas streams. The absorber device is operated under two modes, i.e.: (a) thermodynamic-driven mass transfer at the front end of the absorber device, i.e. wherein the gas stream enters the absorber device, and (b) kinetic-driven mass transfer at the back end of the absorber device, i.e., wherein the gas stream exits the absorber device. The kinetic-driven mass transfer is facilitated by performing gas absorption with an appropriately configured lean absorption liquid solvent system at an elevated temperature in the second section of the absorber device, i.e., the section next to the first section adjacent the gas stream outlet from the absorber device. The thermodynamic-driven mass transfer is facilitated by performing gas absorption with liquid solution having relatively high gas content at a low temperature. Compared to temperature profiles of absorption liquid solvent systems in prior art processes used for removal of gaseous components from gas streams, the process of the present invention provides an inverse temperature profile. In typical operation of conventional processes, the temperatures at the back end of the absorber devices are much lower than those at the front end of the absorber devices due to the exothermic release of heat energy during absorption of gaseous components by the liquid solvent systems. In contrast, the process of the present invention provides higher temperatures at the back end of the absorber device compared cooler temperatures provided at the front end of the absorber device.

Example 1

A coal-fired power plant removes $CO_2$ from combustion flue gas with 95% removal efficiency by using a gas absorption unit provided with a 30% aqueous solution of monoethanolamine (MEA). The flue gas is produced at a rate of 5,000,000 m³/day and contains 16.2% $CO_2$ (1,400 tonnes/day). The temperature of the flue gas entering the absorber is 40° C. The absorber pressure is 1 atm. The reboiler temperature is 116° C.

An in-house process simulator was used for: (a) simulating the operations of the $CO_2$ absorption using the apparatus, methods and process configurations according to the present invention, and (b) comparisons of said operations with those of prior art systems. Table 1 shows the simulation results and demonstrates that, compared to conventional and other processes, the present invention provides a lower temperature of rich absorption liquid at the bottom of the absorber, thus facilitating a rich-pinch operation, thereby achieving a greater $CO_2$ loading of rich absorption liquid and reducing circulating rate of absorption liquid. In addition, the present invention also provides greater % $CO_2$ flashing before the regenerator than the prior art, thereby saving the energy used for solvent regeneration. Case-A (i.e. the present invention) and Case-B (i.e., the present invention) result in 54 and 56% energy saving compared to the conventional process, while prior art systems disclosed by U.S. Pat. No. 6,800,120 B1 (the "split flow" system) and WO 04/073838 processes yield 35% and 42% energy savings respectively.

TABLE 1

Comparison of efficiencies and benefits of the $CO_2$ capture from a coal-fired power plant using the process of the present invention with prior art systems.

| CONDITION | THIS INVENTION (CASE-A) | THIS INVENTION (CASE-B) | CONVENTIONAL PRIOR ART PROCESS | PRIOR ART DISCLOSED IN U.S. Pat. No. 6,800,120 B1 | PRIOR ART DISCLOSED IN WO 04/073838 |
|---|---|---|---|---|---|
| Flue gas flow rate (m³/day) | 5,000,000 | 5,000,000 | 5,000,000 | 5,000,000 | 5,000,000 |
| $CO_2$ in feed gas (tonnes/day) | 1,400 | 1,400 | 1,400 | 1,400 | 1,400 |
| % $CO_2$ in feed gas | 16.2 | 16.2 | 16.2 | 16.2 | 16.2 |
| % $CO_2$ removal | 95 | 95 | 95 | 95 | 95 |
| Temperature of flue gas feed in (° C.) | 40 | 40 | 40 | 40 | 40 |
| Absorber pressure (atm) | 1 | 1 | 1 | 1 | 1 |
| Absorption liquid | 30% aqueous solution of MEA | 30% aqueous solution of MEA | 30% aqueous solution of MEA | 30% aqueous solution of MEA | 30% aqueous solution of MEA |
| Reboiler temperature (° C.) | 116 | 116 | 116 | 116 | 116 |
| Temperature of rich absorption liquid at absorber bottom (° C.) | 34 | 38 | 68 | 64 | 68 |
| Lean $CO_2$ loading (mol/mol) | 0.19 | 0.28 | 0.19 | 0.19 | 0.19 |
| Rich $CO_2$ loading (mol/mol) | 0.58 | 0.56 | 0.44 | 0.50 | 0.465 |
| Circulating rate of absorption liquid (m³/hr) | 646 | 916 | 1,028 | 1,010 | 1,410 |
| % $CO_2$ flashing before regenerator | 31 | 37 | 0 | 12 | 8 |
| Benefit: | | | | | |
| Reboiler heat-duty (Btu/lb mol $CO_2$) | 39,850 | 41,480 | 90,650 | 59,240 | 52,450 |
| Reboiler heat-duty (kJ/kg $CO_2$) | 2,102 | 2,188 | 4,782 | 3,125 | 2,767 |
| % Energy saving (reboiler) | 56 | 54 | 0 | 35 | 42 |

While this invention has been described with respect to the preferred embodiments, those skilled in this art will understand how to modify and adapt the apparatus and processes disclosed herein for removal and recovery of gaseous components from gas streams produced by combustion or in chemical processes. Therefore, it is to be understood that various alterations and modifications can be made to the heat recovery and gas absorption apparatus and associated processes within the scope of this invention.

The invention claimed is:

1. An apparatus for removing and recovering at least one selected gaseous component from a gas stream, the apparatus comprising:
   an absorber device configured with a plurality of sequentially adjacent sections for flowing a gas stream therethrough, said absorber device provided with an inlet at one end and an outlet at the opposing end for said gas stream;
   a conduit infrastructure for conveying an absorption liquid solvent system configured to remove, assimilate and accumulate therein a selected gaseous component from the gas stream, said conduit infrastructure configured to communicate with each section of said absorber device to flow said solvent system therethrough against said gas stream in a pattern selected from the group consisting of counterflowing and crossflowing, a section of said conduit infrastructure egressing from a bottom portion of each section of said absorber and ingressing into a top portion of the adjacent section of said absorber device;
   a first plurality of equipment interposed each section of conduit infrastructure egressing from a bottom portion of each section and ingressing into a top portion of the adjacent section of said absorber device, said plurality of equipment configured to controllably increase the temperature of said absorption liquid solvent system conveyed therein said section of the conduit infrastructure; and
   a second plurality of equipment configured to communicate and cooperate with the conduit infrastructure to: (a) remove and recover the absorbed and accumulated gaseous component from the liquid solvent system, (b) regenerate the absorption liquid solvent system, (c) recycle said regenerated absorption liquid solvent system back to the absorber device, and (d) controllably manipulate and adjust the temperature of said liquid solvent system during recycling back to the absorber device.

2. The apparatus of claim 1, wherein said outlet of the absorber device communicates with a condenser for flowing the gas stream therethrough.

3. The apparatus of claim 1, wherein a phase separator is interposed said first and second pluralities of equipment.

4. The apparatus of claim 1, wherein a phase separator is provided for flowing therethrough said gaseous component recovered by said second plurality of equipment.

5. The apparatus of claim 1, wherein said conduit infrastructure is a piping infrastructure.

6. The apparatus of claim 1, wherein the absorber device comprises a multi-sectioned oriented absorption column provided with a gas inlet near the bottom of the column for receiving therethrough a gas stream, a gas outlet at the top of the column for releasing therethrough said gas stream, said column provided with a plurality of sequentially adjacent sections interposed said gas inlet and said gas outlet wherein a first section is adjacent to the gas outlet at the top of said column and a last section communicates with the gas inlet near the bottom of said column.

7. The apparatus of claim 1, wherein the first plurality of equipment is configured to controllably decrease the temperature of said solvent system during conveyance therein the conduit infrastructure between subsequent sections of the absorber device.

8. The apparatus of claim 1, wherein the first plurality of equipment comprises at least one heat exchange unit interposed each section of said conduit infrastructure egressing from a bottom portion of each section of said absorber and ingressing into a top portion of the adjacent section of said absorber device.

9. The apparatus of claim 8, wherein the first plurality of equipment is provided with at least one cooling unit configured to cooperate with each heat exchange unit interposed a second section and subsequent sections of said absorber device.

10. The apparatus of claim 9, wherein the at least one cooling unit is configured to cooperate with a plurality of heat exchange units interposed the second section and subsequent sections of said absorber device.

11. The apparatus of claim 10, wherein said cooling unit is a pinched cooling unit.

12. The apparatus of claim 1, wherein the second plurality of equipment is provided with at least one heat exchange unit configured to cooperate with the conduit infrastructure egressing from the bottom portion of a section of the absorber device and ingressing into the top portion of an adjacent section of said absorber device.

13. The apparatus of claim 1, wherein the second plurality of equipment comprises:
   at least one regenerator for separating the absorption liquid solvent system containing therein said absorbed and assimilated gaseous component, into a stream comprising the gaseous component and a stream of partially regenerated liquid solvent system;
   at least one reboiler unit for heating and regenerating therein said liquid solvent system;
   at least one heat exchange unit for flowing therethrough said stream comprising the gaseous component, said heat exchange unit communicating with said reboiler unit;
   at least one heat exchange unit configured to controllably decrease the temperature of the regenerated solvent system; and
   at least one cooling unit configured to controllably decrease the temperature of the regenerated solvent system before ingressing the absorption liquid solvent into the first section of absorber.

14. The apparatus of claim 13, wherein the stream comprising the gaseous component is a steam stream.

15. The apparatus of claim 13, wherein the stream comprising the gaseous component is a vapor stream.

16. A process for removing and recovering a selected gaseous component from a gas stream, the process comprising:
   flowing the gas stream through an absorber device provided with a plurality of sequentially adjacent sections, said gas stream flowing from a bottom end to a top end of the absorber device and egressing from said top end;
   commingling and contacting the gas stream therein each section of said absorber device with an absorption liquid solvent system flowing therethrough in a pattern selected from the group consisting of counterflowing and crossflowing, thereby enriching said absorption liquid solvent system with said gaseous component;
   providing conditions: (a) at the bottom end of said absorber device for thermodynamic-driven mass transfer of the selected gaseous component into the absorption liquid solvent system, and (b) at the top end of said absorber device for kinetic-driven mass transfer of the selected gaseous component into the absorption liquid solvent system, wherein said kinetic-driven mass transfer is provided by: (c) controllably cooling said absorption liquid solvent system before it is ingressed into the first section at the top end of the absorber device, and (d) by egressing said solvent system from the first section and controllably heating said solvent system before it is ingressed into the second section of the absorber device;

providing an inverse temperature profile in the absorber device wherein a higher temperature is provided in a section adjacent to said top end of said absorber device relative to a temperature provided in a section at said bottom end of said absorber device;

recovering said gaseous component from the absorption liquid solvent system;

regenerating said absorption liquid solvent system in a regenerator, said regenerator cooperating with a reboiler; and recycling said absorption liquid solvent system to the absorber device.

17. The process of claim 16, wherein the egressing gas stream is a steam stream.

18. The process of claim 16, wherein the egressing gas stream is a vapor stream.

19. The process of claim 16, additionally comprising recovering excess energy from a gas stream egressing from the regenerator and recycling said recovered energy to the reboiler.

20. The process of claim 16, wherein said gas stream is a combustion exhaust gas stream.

21. The process of claim 16, wherein said gas stream is a process gas stream.

22. The process of claim 16, wherein said gas stream egressing from said top end of the absorber device is provided with a two-stage water balance control wherein the first step comprises commingling and contacting the gas stream with a cooled absorption liquid solvent system at the top end of the absorber device, and the second step comprises flowing said gas stream through a condenser interconnected with and communicating with said absorber device.

23. The process of claim 16, wherein said gaseous component is selected from the group consisting of $CO_2$, $H_2S$, $SO_2$ and $NO_x$.

24. The process of claim 16, wherein the absorption liquid solvent system is progressively enriched with said selected gaseous component as said solvent system progressively sequentially flows in a pattern selected from the group comprising counterflowing and crossflowing, through the sections of the absorber device from the top end to the bottom end of said absorber device against the flow of the gas stream therethrough.

25. The process of claim 16, wherein said thermodynamic-driven mass transfer is provided by egressing said solvent system from the second section of the absorber device, and controllably cooling said solvent system before it is ingressed into an adjacent section of the absorber device.

26. The process of claim 25, wherein said thermodynamic-driven mass transfer is provided by successively egressing said solvent system from the each of plurality of sections adjacent the second section of the absorber device and controllably cooling said solvent system before it is ingressed into an adjacent section.

27. The process of claim 16, wherein at least a portion of the conditions providing said kinetic-driven mass transfer is derived from heat recovered and transferred from the regenerated absorption liquid solvent system.

28. The process of claim 16, wherein at least a portion of the heat recovered during said thermodynamic-driven mass transfer is transferred to said enriched liquid solvent.

29. The process of claim 16, wherein heat generated during the recovery of the gaseous component from the absorption liquid solvent system is recovered for use in regenerating said solvent system.

30. The process of claim 16, wherein the absorption liquid solvent system comprises at least one chemical compound selected to react with and remove said gaseous component from the gas stream.

31. The process of claim 16, wherein said absorption liquid solvent system comprises at least one first chemical compound selected to react with and remove said gaseous component from the gas stream, and at least one second chemical compound selected from the group consisting of kinetic enhancers, corrosion inhibitors, anti-foam chemicals, oxygen scavengers, salt neutralizers, anti-fouling and anti-degradation chemicals.

32. The process of claim 30, wherein said at least one chemical compound is selected from the group consisting of monoethanolamine, diglycolamine, diethanolamine, methyldiethanolamine, 2-amino-2-methyl-1-propanol, piperazine, ammonia, amines, alkanolamines and derivatives thereof.

33. The process of claim 31, wherein said at least one first chemical compound is selected from the group consisting of monoethanolamine, diglycolamine, diethanolamine, methyldiethanolamine, 2-amino-2-methyl-1-propanol, piperazine, ammonia, amines, alkanolamines and derivatives thereof.

34. A process for removing and recovering a selected gaseous component from a gas stream, the process comprising:

flowing the gas stream through an absorber device provided with a plurality of sequentially adjacent sections;

delivering a controllably cooled lean absorption liquid solvent to the top section of said absorber device, flowing said cooled lean absorption liquid solvent in a pattern selected from the group consisting of counterflowing and crossflowing, and commingling said cooled lean absorption liquid solvent with the gas stream thereby removing a portion of said gaseous component from the gas stream into said liquid solvent, egressing said liquid solvent from a bottom portion of said top section, and controllably heating the temperature of said egressed liquid solvent;

ingressing the heated liquid solvent into a top portion of a section of the absorber device adjacent to the top section, flowing said heated liquid solvent in a pattern selected from the group comprising counterflowing and crossflowing, and commingling said heated liquid solvent with said gas stream thereby removing an additional portion of said gaseous component from the gas stream thereby enriching the liquid solvent system with said gaseous component, egressing said liquid solvent from a bottom portion of said the section adjacent to the top section, and controllably cooling the temperature of said egressed liquid solvent;

recovering said gaseous component from the enriched liquid solvent system;

regenerating said liquid solvent into a lean absorption liquid solvent system; and controllably cooling and delivering said absorption liquid solvent system to the top section of the absorber device.

35. The process of claim 34, wherein said absorption liquid solvent system is progressively enriched with said selected gaseous component as said solvent system progressively flows in a pattern selected from the group consisting of counterflowing and crossflowing, through the sequentially adjacent sections of the absorber device against the flow of the gas stream therethrough.

36. The process of claim 34, wherein heat is recovered during said thermodynamic-driven mass transfer within said absorber device, to facilitate recovery of the gaseous component from the absorption liquid solvent system.

37. The process of claim 34, wherein heat generated during the recovery of the gaseous component from the gas stream is recovered for use in regenerating said enriched absorption liquid solvent system.

38. The process of claim 34, wherein heat recovered from the lean absorption liquid solvent is communicated to the absorption liquid solvent egressing from the bottom portion of the top section of said absorber device.

39. The process of claim 34, wherein said gaseous component is selected from the group consisting of $CO_2$, $H_2S$, $SO_2$ and $NO_x$, and said gas stream is selected from the group consisting of a combustion exhaust gas stream and a process gas stream.

40. The process of claim 34, wherein the absorption liquid solvent comprises at least one chemical compound selected from group consisting of monoethanolamine, diglycolamine, diethanolamine, methyldiethanolamine, 2-amino-2-methyl-1-propanol, piperazine, ammonia, amines, alkanolamines and derivatives thereof.

41. The process of claim 40, wherein the absorption liquid solvent additionally comprises at least one chemical compound selected from the group consisting of kinetic enhancers, corrosion inhibitors, anti-foam chemicals, oxygen scavengers, salt neutralizers, anti-fouling and anti-degradation chemicals.

* * * * *